(12) United States Patent
Iwasa et al.

(10) Patent No.: US 7,120,266 B2
(45) Date of Patent: Oct. 10, 2006

(54) PENDENT AUDIO PLAYER

(75) Inventors: Toshihide Iwasa, Neyagawa (JP); Toru Kamimura, Shiga (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 90 days.

(21) Appl. No.: 10/470,279

(22) PCT Filed: Feb. 8, 2002

(86) PCT No.: PCT/JP02/01066

§ 371 (c)(1),
(2), (4) Date: Aug. 7, 2003

(87) PCT Pub. No.: WO02/063598

PCT Pub. Date: Aug. 15, 2002

(65) Prior Publication Data

US 2004/0066949 A1    Apr. 8, 2004

(30) Foreign Application Priority Data

Feb. 8, 2001   (JP) .............................. 2001-031798

(51) Int. Cl.
*H04R 1/02* (2006.01)
*G05B 11/01* (2006.01)

(52) U.S. Cl. .................. 381/333; 381/334; 700/13

(58) Field of Classification Search ............... 381/334, 381/333; 700/13, 17; 455/90.1, 90.2, 90.3, 455/566

See application file for complete search history.

(56) References Cited

U.S. PATENT DOCUMENTS

2002/0095538 A1 * 7/2002 Marshall ...................... 710/74

FOREIGN PATENT DOCUMENTS

| JP | 6-243662 | 9/1994 |
|---|---|---|
| JP | 7-36388 | 8/1995 |
| JP | 10-283080 | 10/1998 |
| JP | 2000-098990 | 4/2000 |
| JP | 2000-206952 | 7/2000 |
| JP | 2000-250419 | 9/2000 |

\* cited by examiner

*Primary Examiner*—Sinh Tran
*Assistant Examiner*—Brian Ensey
(74) *Attorney, Agent, or Firm*—Armstrong, Kratz, Quintos, Hanson & Brooks, LLP

(57) ABSTRACT

The present invention provides an audio player wearable around the neck which comprises vertical direction recognition sensor 2 for recognizing hanging state wherein a casing 10 is hung from the neck using a neck strap 11 and holding state wherein the casing 10 is turned upside down from said hanging state and is held in the hand, and a control circuit 3 for change-over-controlling the presentation state of the display 8 in accordance with the recognition result obtained by the vertical direction recognition sensor 2. This can avoid the problem when the display is turned upside down between the hanging state and the holding state of the casing.

2 Claims, 3 Drawing Sheets

PENDENT AUDIO PLAYER

TECHNICAL FIELD

The present invention relates to audio players wherein the user can listen to music with the player hung from the neck using a neck strap.

BACKGROUND ART

In recent years already in wide use have been portable audio players having incorporated therein a memory storing audio data, and wherein the audio data is read from the memory to reproduce the data as voice. The user manipulates the audio player of the type described to perform reproduction operation with the player hung from the neck using a neck strap, enabling the user to enjoy listening to music while walking. Further the audio player of the type described comprises a casing having a display arranged on its front surface. The user can perform the manipulation for various reproduction operations while monitoring the display.

With the audio player wearable around the neck described, the presentation of the display arranged on the surface of the casing is shown as in a normal vertical direction when the user holds the player in his hand to perform key manipulation. After the start of the reproduction operation, when the user listens to music with the player hung up, the casing is turned upside down, so that the presentation of the display is viewed as vertically reversed by the person who is facing the user. Particularly, since the audio player wearable around the neck is worn for fashion sense, it is not preferable that the presentation of the display is shown as vertically reversed when the player is viewed by the person facing the user.

An object of the present invention is to provide an audio player wearable around the neck which is adapted to avoid the problem when the display is turned upside down between the hanging state and the holding state of the casing.

DISCLOSURE OF THE INVENTION

The present invention provides an audio player wearable around the neck which comprises a casing 10 to be hung from the neck using a neck strap 11, and having arranged thereon an audio reproduction circuit 5 for reproducing an audio signal and a display 8 for showing information on the audio reproduction. The audio player comprises state recognition means for recognizing hanging state wherein the casing 10 is hung from the neck using the neck strap 11 and holding state wherein the casing 10 is held in the user's hand with the casing turned upside down from the hanging state, and control means for change-over-controlling the presentation state of the display 8 in response to the recognition result obtained by the state recognizing means. Stated specifically, the state recognition means comprises a vertical direction recognition sensor 2 for recognizing a vertical direction of the casing 10 based on the gravity acting direction.

Stated specifically, when the presentation of the display 8 is changed over in response to the recognition result obtained by the state recognizing means, it is effective to turn upside down the presentation of the display 8 between the hanging state and the holding state. Accordingly, in the holding state the user can view the presentation of the display 8 normally, while in the hanging state the person who is facing the user can view the display 8 normally. In the holding state the display 8 has shown the presentation in accordance with the user's manipulation, while in the hanging state the display 8 has shown the presentation in accordance with the reproduced sound.

Furthermore according to another specific construction, the display 8 has a backlight 9, and the backlight 9 is turned off in the hanging state while turned on in the holding state. This enables the user to view the presentation of the display 8 in the holding state. However, in the hanging state the person who is facing the user cannot view the presentation of the display 8 since the backlight 9 is turned off.

Stated more specifically, the presentation operation of the display 8 is started with the change-over from the hanging state to the holding state while the presentation operation of the display 8 is ceased with the change-over from the holding state to the hanging state. Thus the user can view the presentation of the display 8 in the holding state while in the hanging state the person who is facing the user cannot view the presentation of the display 8 since the presentation operation of the display 8 is automatically ceased.

As described above, the present invention provides an audio player wearable around the neck which is adapted to avoid the problem when the display is turned upside down since the presentation of the display is changed over between the hanging state and the holding state of the casing.

BEST MODE OF CARRYING OUT THE INVENTION

Figure 2:
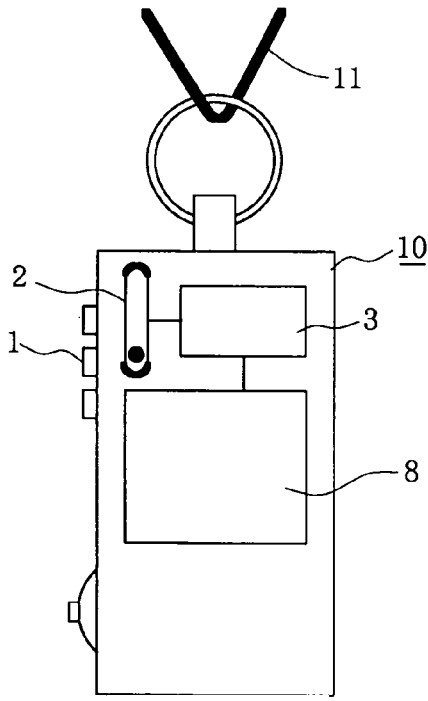
FIG. 2 is a front view showing a casing and a part of interior structure of the audio player wearable around the neck.

Embodiments of the invention will be described below in detail with reference to the drawings. An audio player embodying the present invention comprises a casing 10 which is adapted to hang from the neck using a neck strap 11 as shown in FIG. 2. The casing 10 is provided with a manipulation key 1 and a display 8.

Figure 1:
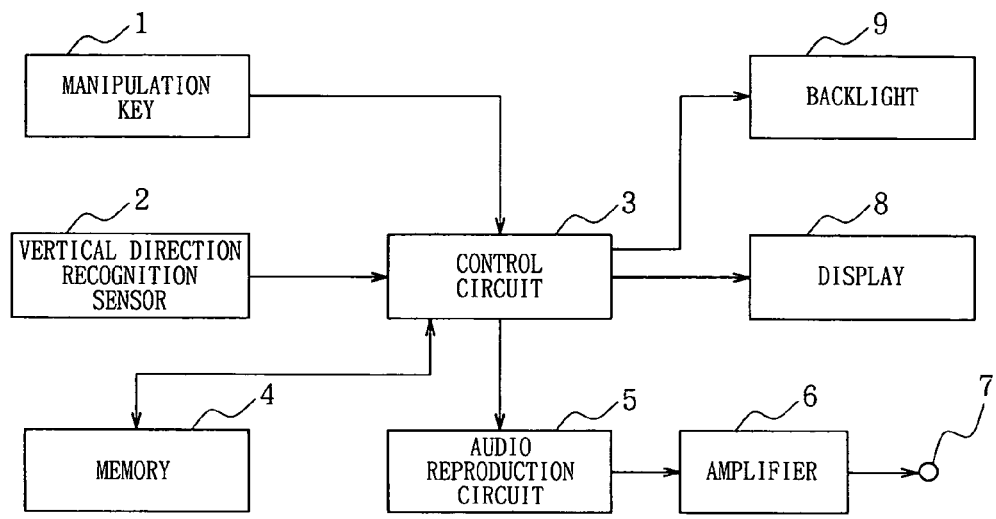
FIG. 1 is a block diagram showing a device structure of an audio player wearable around the neck embodying the present invention.

With reference to FIG. 1, incorporated inside the casing 10 are a memory 4 storing audio data, an audio reproduction circuit 5 for giving decoding processing to the audio data read out from the memory 4 and reproducing an audio signal, an amplifier 6 for amplifying the reproduced audio signal and feeding the signal to an output terminal 7, a backlight 9 for illuminating a screen of the display 8, control circuit 3 for controlling read-out of the audio data from the memory 4, reproduction operation of the audio reproduction circuit 5, presentation operation of the display 8, and turning on/off the backlight 9.

Furthermore, incorporated in the casing 10 is a vertical direction recognition sensor 2 wherein contacts are changed over depending on the gravity acting direction as schematically shown in FIG. 2. A vertical direction recognition signal generated by the vertical direction recognition sensor 2 is fed to the control circuit 3, changing over the presentation operation of the display 8.

Figure 3:
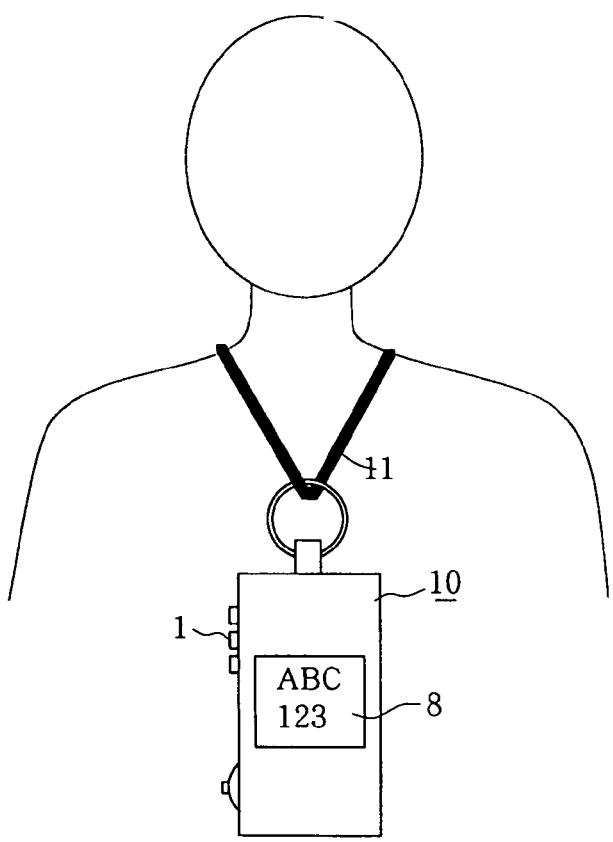
FIG. 3 is an illustration showing hanging state of the audio player wearable around the neck and the presentation of a display.
Figure 4:
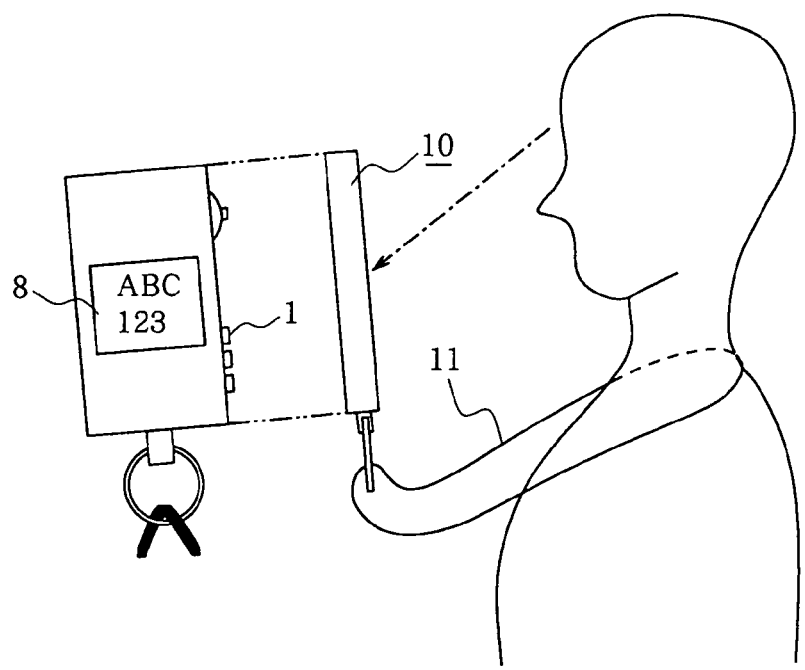
FIG. 4 is an illustration showing holding state of the hanging audio player and the presentation of the display.

Stated specifically, when the casing 10 is hung from the user's neck using the neck strap 11, the direction of the presentation of the display 8 is set so that a person who is facing the user can view normally the presentation of the display 8, as shown in FIG. 3. The display 8 has shown a character corresponding to a reproduced sound, for example, or a preliminary prepared image. On the other hand, when the user holds the casing 10 in his hand with the casing turned upside down, the presentation of the display 8 is vertically reversed so that the user can view normally the presentation of the display 8, as shown in FIG. 4. At this moment the display 8 has shown the presentation in response to the user's manipulation.

Accordingly, in the holding state shown in FIG. 4 the user can manipulate the manipulation key 1 referring to the presentation of the display 8, while in the hanging state shown in FIG. 3 the person who is facing the user can view the presentation of the display 8 without sensing a discomfort. This can give more sophisticated fashion sense to the audio player wearable around the neck.

Figure 5:
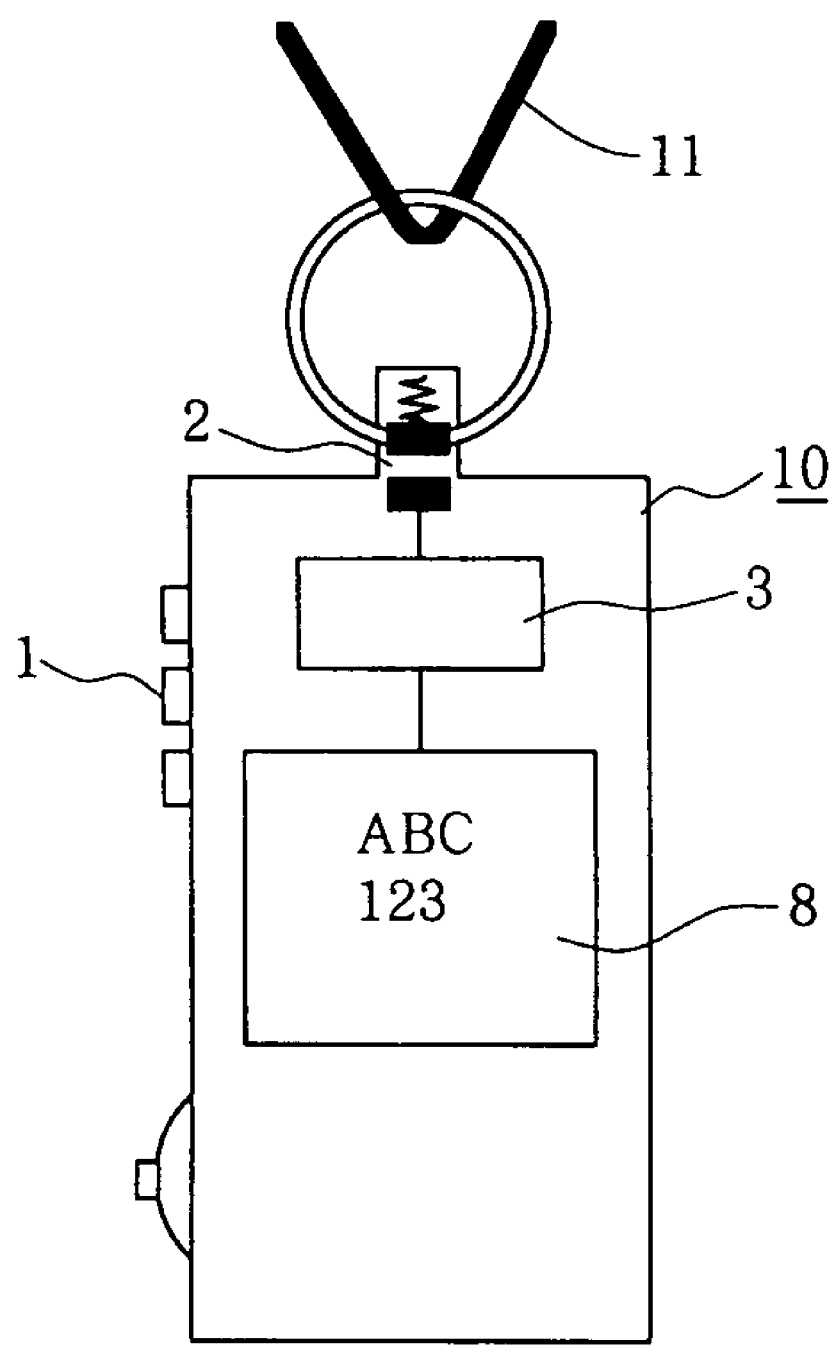
FIG. 5 is an illustration showing another structure of the audio player wearable around the neck embodying the present invention.

The device of the present invention is not limited to the foregoing embodiments in construction but can be modified variously within the technical scope set forth in the appended claims. For example, also usable as a vertical direction recognition sensor 2 is the one wherein the contacts are open by the gravity of the casing 10 in the hanging state while the contacts are closed by the force of a spring in the holding state, as schematically shown in FIG. 5. Furthermore, it is possible to recognize the vertical direction of the casing 10 by the presence of a detected signal to be generated in detecting that the casing 10 is held in the hand based on the variations of capacitance.

In order to change over the presentation of the display 8 in response to the recognition result of the vertical direction recognition sensor 2, the backlight 9 is turned off in the hanging state while the backlight 9 is turned on in the holding state, or the presentation operation of the display 8 is started with change-over from the hanging state to the holding state while the presentation operation of the display 8 is ceased with change-over from the holding state to the hanging state.

The invention claimed is:

1. An audio player wearable around the neck comprising a casing 10 to be hung from the neck using a neck strap 11, and having arranged thereon an audio reproduction circuit 5 for reproducing an audio signal and a display 8 for showing information on the audio reproduction, the audio player being characterized in that the player comprises state recognition means for recognizing hanging state wherein the casing 10 is hung from the neck using the neck strap 11 and holding state wherein the casing 10 is held in the user's hand with the casing turned upside down from the hanging state, and control means for change-over-controlling the presentation state of the display 8 in response to the recognition result obtained by the state recognizing means, wherein the control means has shown on the display 8 the presentation in response to the manipulation in the holding state while the control means has shown on the display 8 the presentation in response to the reproduced sound in the hanging state, wherein the display 8 comprises a backlight 9, and the control means turns off the backlight 9 in the hanging state while turned on in the holding state.

2. An audio player wearable around the neck comprising a casing 10 to be hung from the neck using a neck strap 11, and having arranged thereon an audio reproduction circuit 5 for reproducing an audio signal and a display 8 for showing information on the audio reproduction, the audio player being characterized in that the player comprises state recognition means for recognizing hanging state wherein the casing 10 is hung from the neck using the neck strap 11 and holding state wherein the casing 10 is held in the user's hand with the casing turned upside down from the hanging state, and control means for change-over-controlling the presentation state of the display 8 in response to the recognition result obtained by the state recognizing means, wherein the control means has shown on the display 8 the presentation in response to the manipulation in the holding state while the control means has shown on the display 8 the presentation in response to the reproduced sound in the hanging state, wherein the control means starts the presentation operation of the display 8 with the change-over from the hanging state to the holding state while the control means ceases the presentation operation of the display 8 with the change-over from the holding state to the hanging state.

\* \* \* \* \*

UNITED STATES PATENT AND TRADEMARK OFFICE
CERTIFICATE OF CORRECTION

PATENT NO. : 7,120,266 B2 Page 1 of 1
APPLICATION NO. : 10/470279
DATED : October 10, 2006
INVENTOR(S) : Iwasa et al.

It is certified that error appears in the above-identified patent and that said Letters Patent is hereby corrected as shown below:

Title Page and Col. 1 line 1
Delete the present title and insert the following:

(54)   AUDIO PLAYER AROUND THE NECK

Signed and Sealed this

Thirteenth Day of February, 2007

JON W. DUDAS
*Director of the United States Patent and Trademark Office*